United States Patent
Chu et al.

(10) Patent No.: US 6,798,918 B2
(45) Date of Patent: Sep. 28, 2004

(54) SYSTEM AND METHOD USING EDGE PROCESSING TO REMOVE BLOCKING ARTIFACTS FROM DECOMPRESSED IMAGES

(75) Inventors: Ke-Chiang Chu, Saratoga, CA (US); Jian Lu, Santa Clara, CA (US); Yu Tina Tian, Stanford, CA (US); Hsi-Jung Wu, Mountain View, CA (US)

(73) Assignee: Apple Computer, Inc., Cupertino, CA (US)

( * ) Notice: Subject to any disclaimer, the term of this patent is extended or adjusted under 35 U.S.C. 154(b) by 15 days.

(21) Appl. No.: 10/124,932

(22) Filed: Apr. 17, 2002

(65) Prior Publication Data

US 2002/0110284 A1 Aug. 15, 2002

Related U.S. Application Data

(63) Continuation of application No. 08/677,344, filed on Jul. 2, 1996.

(51) Int. Cl.[7] ................................................ G06K 9/40
(52) U.S. Cl. ........................ 382/268; 382/275; 382/168
(58) Field of Search ................................. 382/268, 275, 382/168, 172, 254, 233

(56) References Cited

U.S. PATENT DOCUMENTS

| | | |
|---|---|---|
| 4,709,267 A | 11/1987 | Sendelweck |
| 4,733,229 A | 3/1988 | Whitehead |
| 4,876,663 A | 10/1989 | McCord |
| 4,907,174 A | 3/1990 | Priem |
| 4,939,645 A * | 7/1990 | Hopkinson ................ 382/275 |
| 5,065,444 A * | 11/1991 | Garber ..................... 382/275 |
| RE33,973 E | 6/1992 | Kriz et al. |
| 5,150,107 A | 9/1992 | Kurisu |
| 5,204,748 A | 4/1993 | Lagoni |
| 5,313,291 A | 5/1994 | Appel et al. |
| 5,386,247 A | 1/1995 | Shafer et al. |
| 5,394,067 A | 2/1995 | Santelmann, Jr. |
| 5,469,540 A | 11/1995 | Powers, III et al. |
| 5,473,371 A | 12/1995 | Choi |
| 5,493,317 A | 2/1996 | Kim |
| 5,512,961 A | 4/1996 | Cappels, Sr. |
| 5,550,443 A | 8/1996 | Lee |

(List continued on next page.)

FOREIGN PATENT DOCUMENTS

| | | |
|---|---|---|
| EP | 0856829 A2 | 8/1998 |
| WO | WO 06/17338 | 6/1996 |
| WO | WO 98/32277 | 7/1998 |
| WO | WO 00/17842 | 3/2000 |

OTHER PUBLICATIONS

Stephane Mallet and Sifen Zhong, "Characterization of Signals from Multiscale Edges", IEEE Transactions on Pattern Analysis and Machine Intelligence, vol. 14, No. 7, pp. 710–732, Jul. 1992.

Dennis M. Healy, Jr., Jian Lu and John B. Weaver, "Two Applications of Wavelets and Related Techniques in Medical Imaging", Annals of Biomedical Engineering, vol. 23, pp. 637–665, 1995.

*Primary Examiner*—Thomas D. Lee
(74) *Attorney, Agent, or Firm*—Blakely, Sokoloff, Taylor & Zafman LLP (57) ABSTRACT

A system and method using edge processing to remove blocking artifacts comprises an edge processor having an image converter for building an edge representation of a received image, a statistics analyzer for compiling a histogram containing edge intensities of the edge representation, a reference calculator for using the histogram to compute reference values corresponding to the blocking artifacts and an artifact remover for identifying and removing the blocking artifacts using the computed reference values.

18 Claims, 9 Drawing Sheets

U.S. PATENT DOCUMENTS

| | | |
|---|---|---|
| 5,550,556 A | 8/1996 | Wu et al. |
| 5,555,026 A | 9/1996 | Lee |
| 5,561,459 A | 10/1996 | Stokes et al. |
| 5,564,002 A | 10/1996 | Brown |
| 5,570,108 A | 10/1996 | McLaughlin et al. |
| 5,574,507 A | 11/1996 | Baek |
| 5,579,029 A | 11/1996 | Arai et al. |
| 5,606,348 A | 2/1997 | Chiu |
| 5,638,117 A | 6/1997 | Engeldrum et al. |
| 5,675,391 A | 10/1997 | Yamaguchi et al. |
| 5,706,035 A | 1/1998 | Tsunoda et al. |
| 5,724,519 A | 3/1998 | Kato et al. |
| 5,742,354 A | 4/1998 | Vlahos et al. |
| 5,819,035 A | 10/1998 | Devaney et al. |
| 5,821,917 A | 10/1998 | Cappels |
| 5,850,294 A * | 12/1998 | Apostolopoulos et al. .. 358/433 |
| 5,889,500 A | 3/1999 | Chuang et al. |
| 5,903,267 A | 5/1999 | Fisher |
| 5,926,174 A | 7/1999 | Shibamiya et al. |
| 5,959,691 A | 9/1999 | Koh |
| 5,977,946 A | 11/1999 | Mizobata |
| 5,978,745 A | 11/1999 | Devine |
| 5,990,858 A | 11/1999 | Ozolins |
| 6,026,409 A | 2/2000 | Blumenthal |

\* cited by examiner

SYSTEM AND METHOD USING EDGE PROCESSING TO REMOVE BLOCKING ARTIFACTS FROM DECOMPRESSED IMAGES

The present patent application is a continuation of prior application Ser. No. 08/677,344, filed Jul. 2, 1996, entitled SYSTEM AND METHOD USING EDGE PROCESSING TO REMOVE BLOCKING ARTIFACTS FROM DECOMPRESSED IMAGES.

BACKGROUND OF THE INVENTION

1. Field of the Invention

This invention relates generally to image postprocessing techniques and more particularly to a system and method using edge processing to remove blocking artifacts from decompressed images.

2. Description of the Background Art

Producing high-quality visual images using modern computer techniques is an important consideration of many computer manufacturers and designers. When displayed on a video monitor, an image frame typically comprises many separate picture elements or pixels which are each represented using a corresponding binary value. The computer system thus requires large amounts of digital information to represent each displayed image frame. To conserve memory space and expedite transmission of the digital information, modern computer systems typically code the image frames using a variety of compression techniques. One popular compression coding technique uses an encoder device to divide an image into a number of discrete blocks which are each processed and compressed independently. A corresponding decoder device subsequently decompresses the compressed image prior to display on a video monitor. Examples of conventional formats which utilize block-based image coding and decoding include JPEG, MPEG, H.261 and H263.

Figure 1:
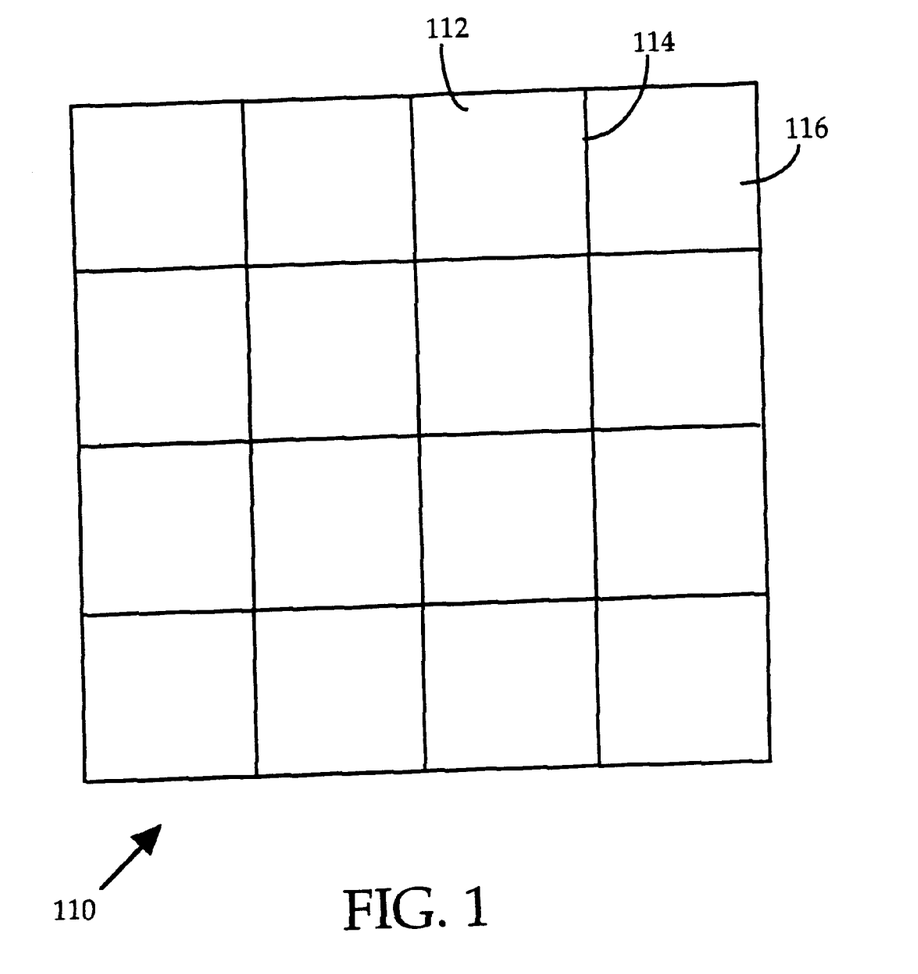
FIG. 1 is a block diagram showing a sample blocked image as processed by a conventional block-based image decoder.

Referring now to FIG. 1, a block diagram of a sample blocked image 110 processed by a conventional block-based image decoder is shown. Sample blocked image 110 includes adjacent blocks 112 and 116 which are separated by boundary 114. Sample blocked image 110 contains sixteen blocks for reasons of clarity, however, in practice, a blocked image may typically contain a greater number of discrete blocks.

Blocking artifacts are relatively common to block-based encoder/decoder systems. Each discrete image block is processed and compressed separately, resulting in frequent variations in average pixel intensity between the various blocks. This causes the human eye to perceive the resultant image frame as a collection of individual blocks, as illustrated in FIG. 1.

For example, block 112 lies adjacent to block 116 along boundary 114. If block 112 and block 116 have different pixel intensities, the human eye will perceive an "edge" along boundary 114. This edge is created by the discontinuity in pixel intensity across boundary 114 between block 112 and block 116. Furthermore, this edge will have an edge intensity proportional to the magnitude of the average difference between the pixel intensity of block 112 and the pixel intensity of block 116.

One conventional postprocessing technique for reducing the block edges is low-pass filtering. The low-pass filter, however, smoothes both the block edges and the perceptually important features of the image, resulting in a blurred image. Adaptive filtering and image restoration techniques may also be used to reduce block edges, however, these techniques may also create new artifacts in the image. Therefore, in accordance with the present invention, an improved system and method is needed for using edge processing to remove blocking artifacts in image decoder devices.

SUMMARY OF THE INVENTION

In accordance with the present invention, a system and method are disclosed for using edge processing to remove blocking artifacts from decompressed images. The present invention comprises an edge processor device which preferably includes an image converter, a statistics analyzer, a reference calculator and an artifact remover.

Initially, the edge processor receives an image containing blocking artifacts such as block edges along boundaries. The image converter then accesses the received image and builds a corresponding edge representation which includes information about edge intensity and edge location. Next, the statistics analyzer constructs a histogram which shows edge intensities along block boundaries within the edge representation.

The reference calculator then derives reference values from the compiled histogram. The reference values correspond to edge intensities which have a high number of occurrences along the block boundaries. The present invention thus identifies the blocking artifacts by determining their corresponding reference values, since the blocking artifacts typically occur at a greater frequency than other edges which fall along block boundaries in the received image.

The artifact remover then removes the blocking artifacts by setting their edge intensities to zero. Finally, the image converter reconstructs the originally-received image after the blocking artifacts have been deleted. The present invention thus effectively removes the blocking artifacts to provide an improved image through the use of the foregoing edge-processing technique.

DETAILED DESCRIPTION OF THE PREFERRED EMBODIMENT

The present invention discloses a system and method for using edge processing to remove blocking artifacts from decompressed images, and comprises an edge processor having an image converter for building an edge representation of a received image, a statistics analyzer for constructing a histogram of edge intensities along the block boundaries, a reference calculator for using the histogram to compute reference values corresponding to the blocking artifacts and an artifact remover for identifying and removing the blocking artifacts using the computed reference values.

Figure 2:
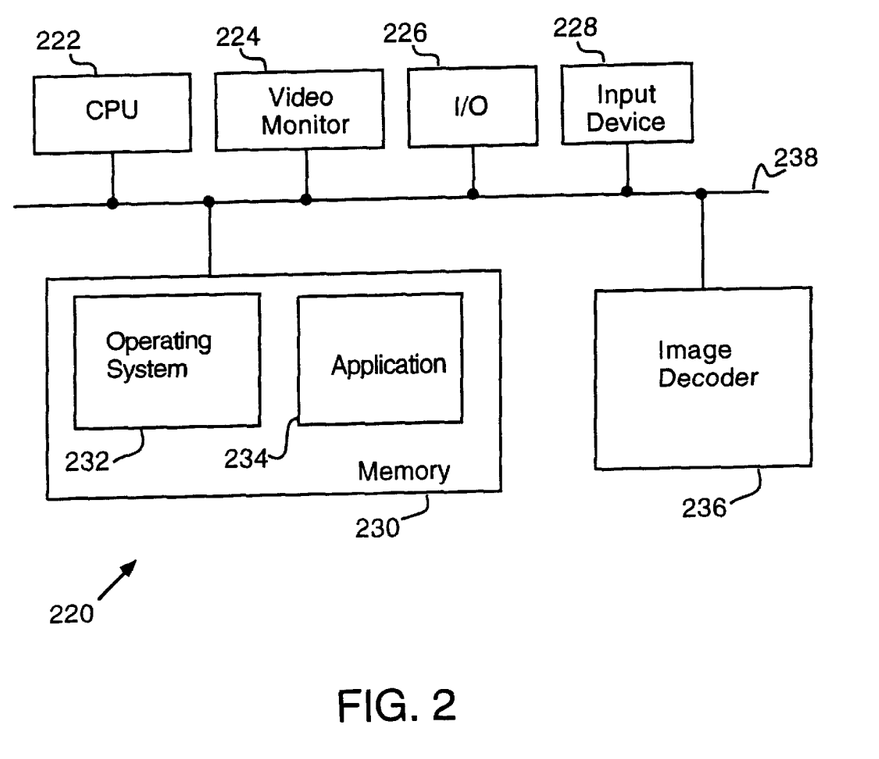
FIG. 2 is a block diagram of a computer system for decoding images according to the present invention.

Referring now to FIG. 2, a computer system 220 for removing blocking artifacts according to the present invention is shown. Computer system 220 preferably comprises a central processing unit (CPU) 222, a video monitor 224, an input/output interface (I/O) 226, an input device 228, a memory 230 and an image decoder 236. Memory 230 contains an operating system 232 and at least one application 234.

Each element of computer system 220 preferably has an input and an output coupled to a common system bus 238. Memory 230 may alternatively comprise various storage-device configurations, including Random-Access-Memory (RAM), Read-Only-Memory (ROM), and non-volatile storage devices such as floppy-disks and hard disk-drives. Image decoder 236 decodes compressed image data according to the present invention and is further described below in conjunction with FIGS. 3–9.

Figure 3:
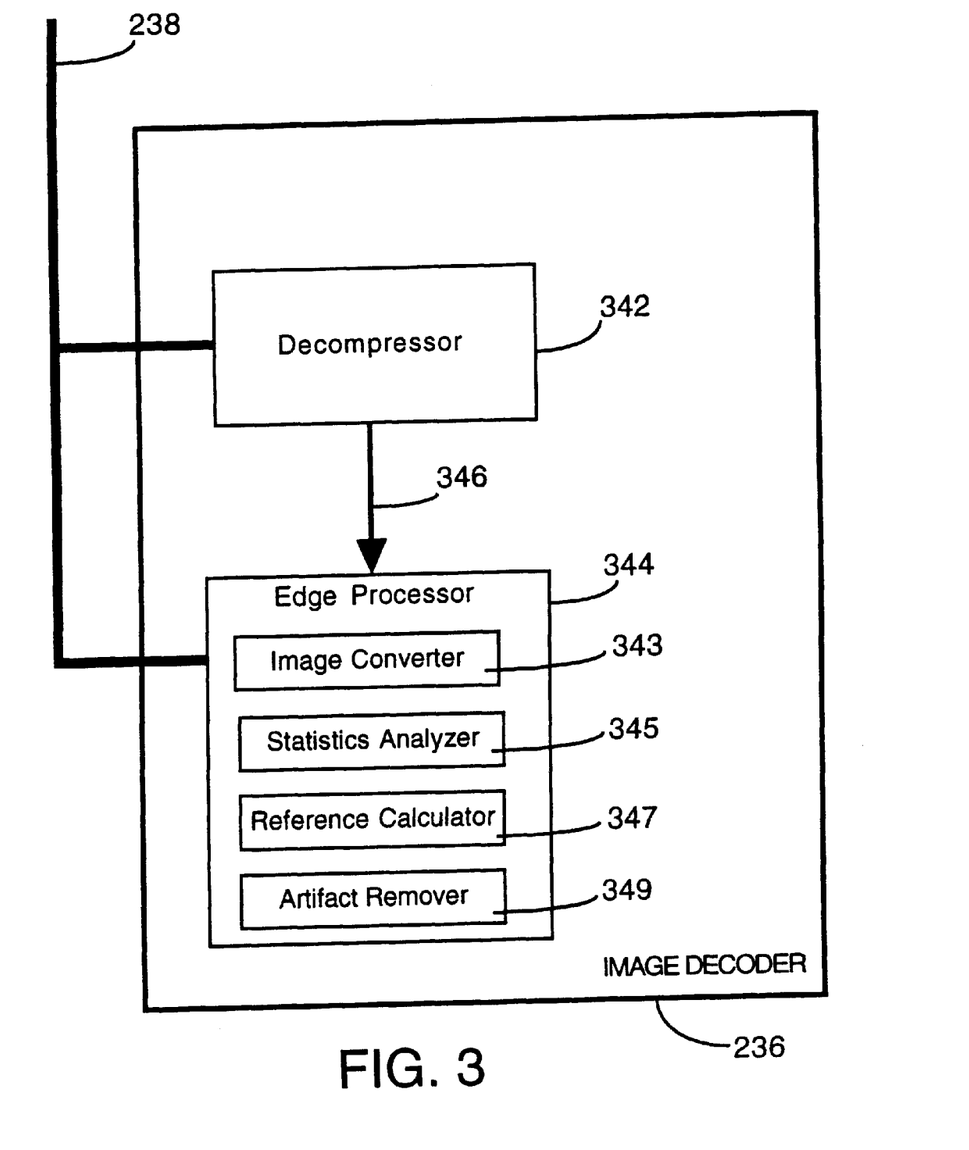
FIG. 3 is a block diagram of the image decoder of FIG. 2 containing the edge processor of the present invention.

Referring now to FIG. 3, a block diagram of the preferred embodiment of image decoder 236 is shown. In the preferred embodiment, image decoder 236 includes decompressor 342 and edge processor 344 which preferably contains image converter 343, statistics analyzer 345, reference calculator 347 and artifact remover 349.

Decompressor 342 receives compressed image data via system bus 238. The compressed image data may be imported from a variety of external sources via I/O 226, or alternatively may come from internal memory 230. Decompressor 342 performs a decompression routine on the compressed image and then provides the decompressed image data to edge processor 344 via line 346. Edge processor 344 removes blocking artifacts from the decompressed image data according to the present invention and then provides the decompressed image data (minus the blocking artifacts) to downstream components of computer system 220 via system bus 238. In the preferred embodiment, edge processor 344 is implemented using software processes, however, in alternate embodiments, edge processor 344 may also be implemented using computer system 220 hardware devices or a combination of software processes and hardware devices. Edge processor is further discussed below in conjunction with FIGS. 4–9.

Figure 4:
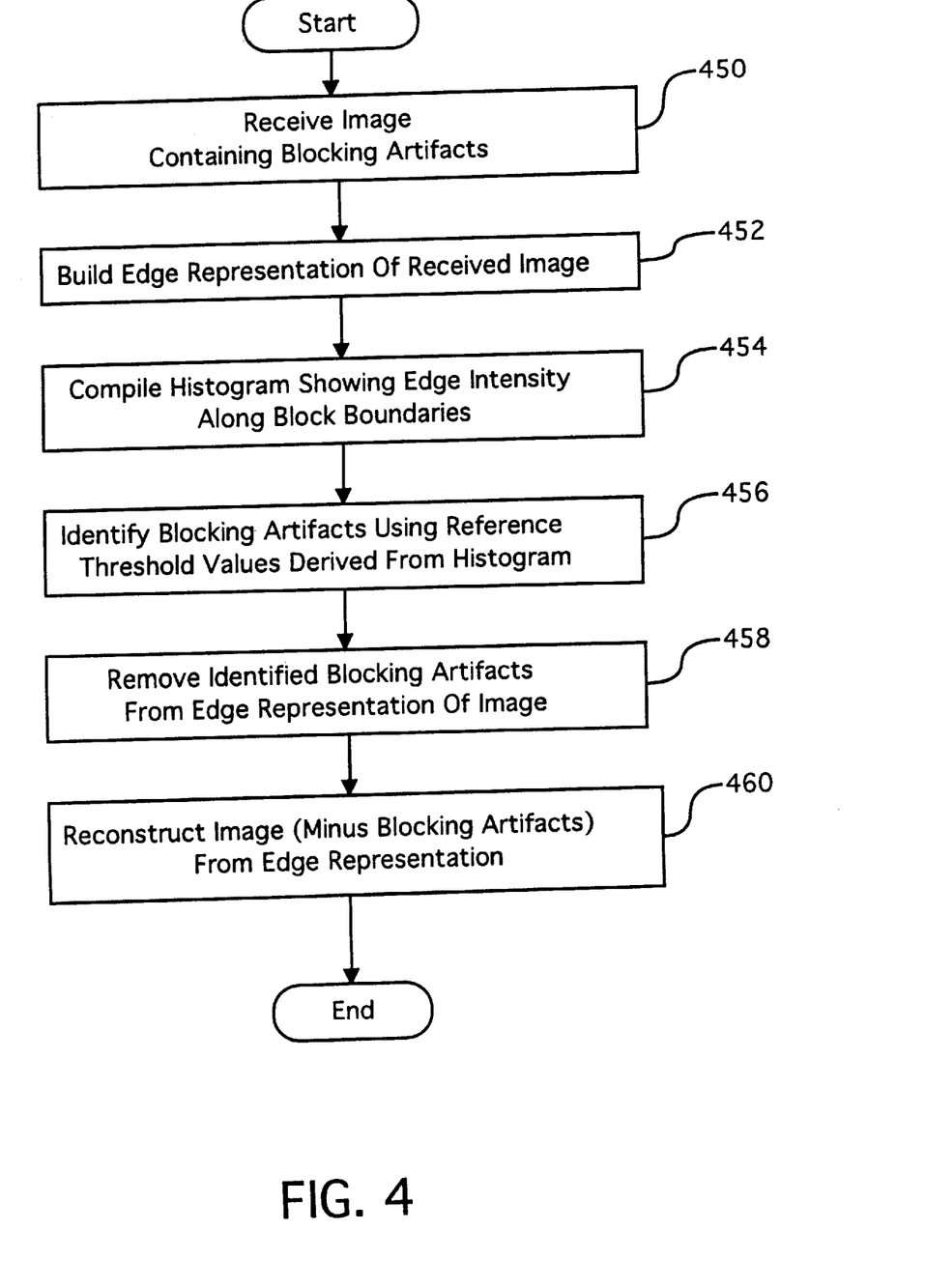
FIG. 4 is a flowchart of preferred general process steps for removing blocking artifacts according to the present invention.

Referring now to FIG. 4, a flowchart of preferred general process steps for removing blocking artifacts is shown. Initially, edge processor 344 receives 450 an image containing blocking artifacts and image converter 343 responsively builds 452 an edge representation of the received image. The present invention does not depend on a particular form of edge representation, however the representation should include information about edge intensity and edge location. The preferred process for building an edge representation is further discussed below in conjunction with FIG. 5.

Statistics analyzer 345 then compiles 454 a histogram showing edge intensities sampled along the block boundaries of the received image. The preferred process for compiling the histogram is further discussed below in conjunction with FIG. 6. A sample histogram according to the present invention is also shown in FIG. 7.

Edge processor 344 then identifies 456 the blocking artifacts (visually-perceptible block edges) in the edge representation. To identify the blocking artifacts, edge processor 344 uses reference values derived from the compiled histogram by reference calculator 347. The preferred method for determining the reference values is further discussed below in conjunction with FIG. 8.

Artifact remover 349 then removes 458 the identified blocking artifacts from the edge representation of the received image. The preferred process for removing the identified blocking artifacts is further discussed below in conjunction with FIG. 9. Finally, image converter 343 reconstructs 460 the received image (minus the blocking artifacts) from the edge representation to produce a decompressed image without visually-perceptible block edges. Image converter 343 may utilize various reconstruction techniques depending on the method used to initially build the edge representation. The reconstruction step 460 essentially inverts the technique used to build the original edge representation (FIG. 4, step 452).

Figure 5:
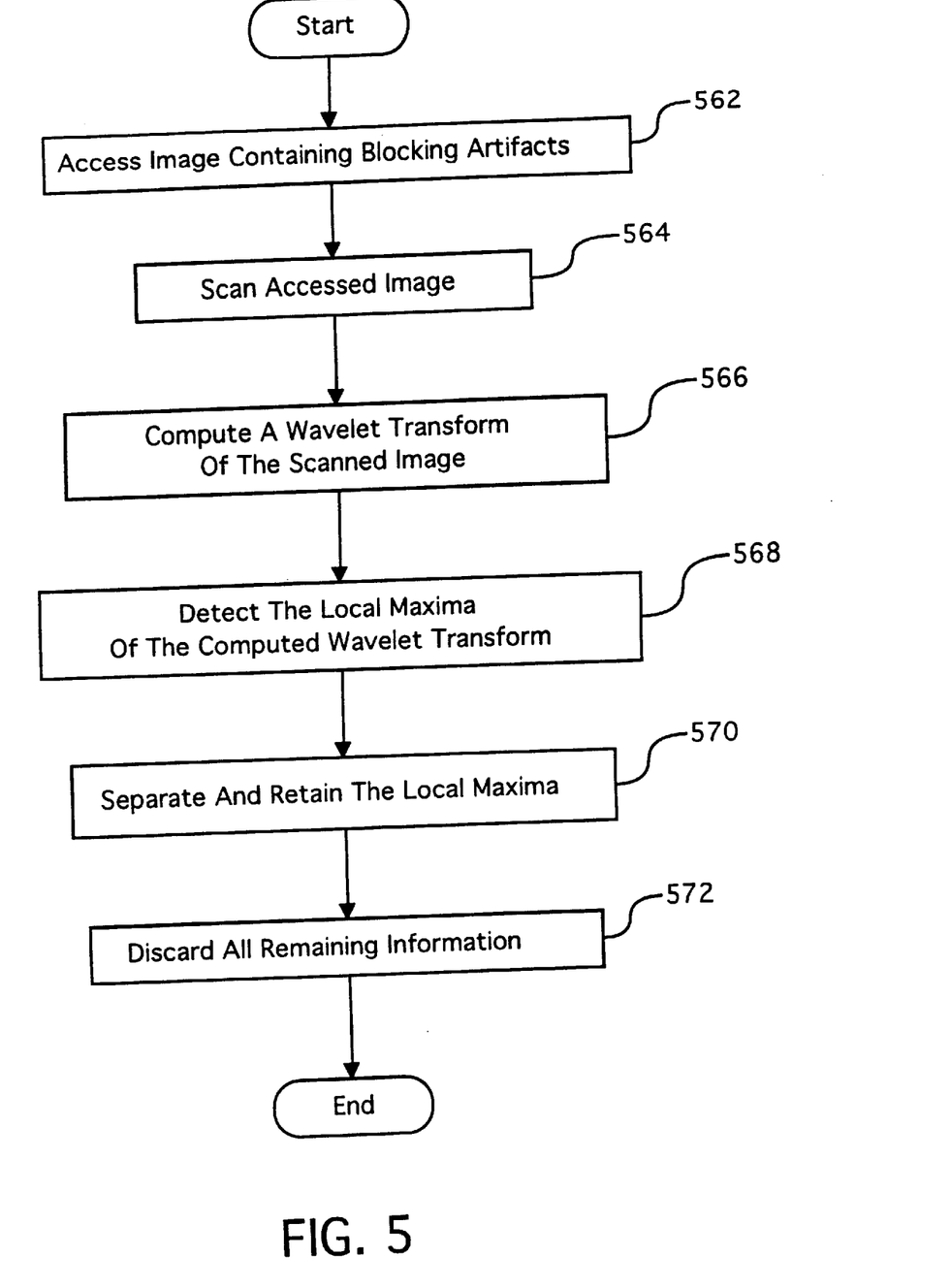
FIG. 5 is a flowchart of preferred method steps for building an edge representation of a received image.

Referring now to FIG. 5, a flowchart of preferred method steps for building an edge representation of a received image is shown. An edge representation is typically created by performing an edge detection procedure on a given image to detect the location and intensity of any image edges. Image edges result from neighboring pixels which have abrupt intensity changes. At the locations of abrupt intensity changes, the human eye perceives an image edge. Furthermore, this image edge will have an edge intensity equal to the gradient magnitude evaluated at the edge location.

The present invention does not depend on a particular form of edge representation, as long as the resultant edge representation includes edge intensity and edge location. The representation must also be invertible to permit subsequent reconstruction of the original image. In the preferred embodiment shown in FIG. 5, image converter 343 builds an edge representation using a technique detailed in *Characterization Of Signals From Multiscale Edges*, Stephane Mallat and Sifen Zhong, IEEE Transactions Of Pattern Analysis And Machine Intelligence, Vol. 14, No. 7, July 1992, which is hereby incorporated by reference.

In FIG. 5, image converter 343 initially accesses 562 an image containing blocking artifacts and scans 564 the accessed image. In the preferred embodiment, image converter 343 then computes 566 a conventional wavelet transform of the scanned image using a differentiation technique. Next, image converter 343 detects 568 the local maxima of the computed wavelet transform. Finally, image converter 343 separates 570 and retains the detected local maxima and discards 572 all remaining information to produce the edge representation, according to the preferred embodiment.

Figure 6:
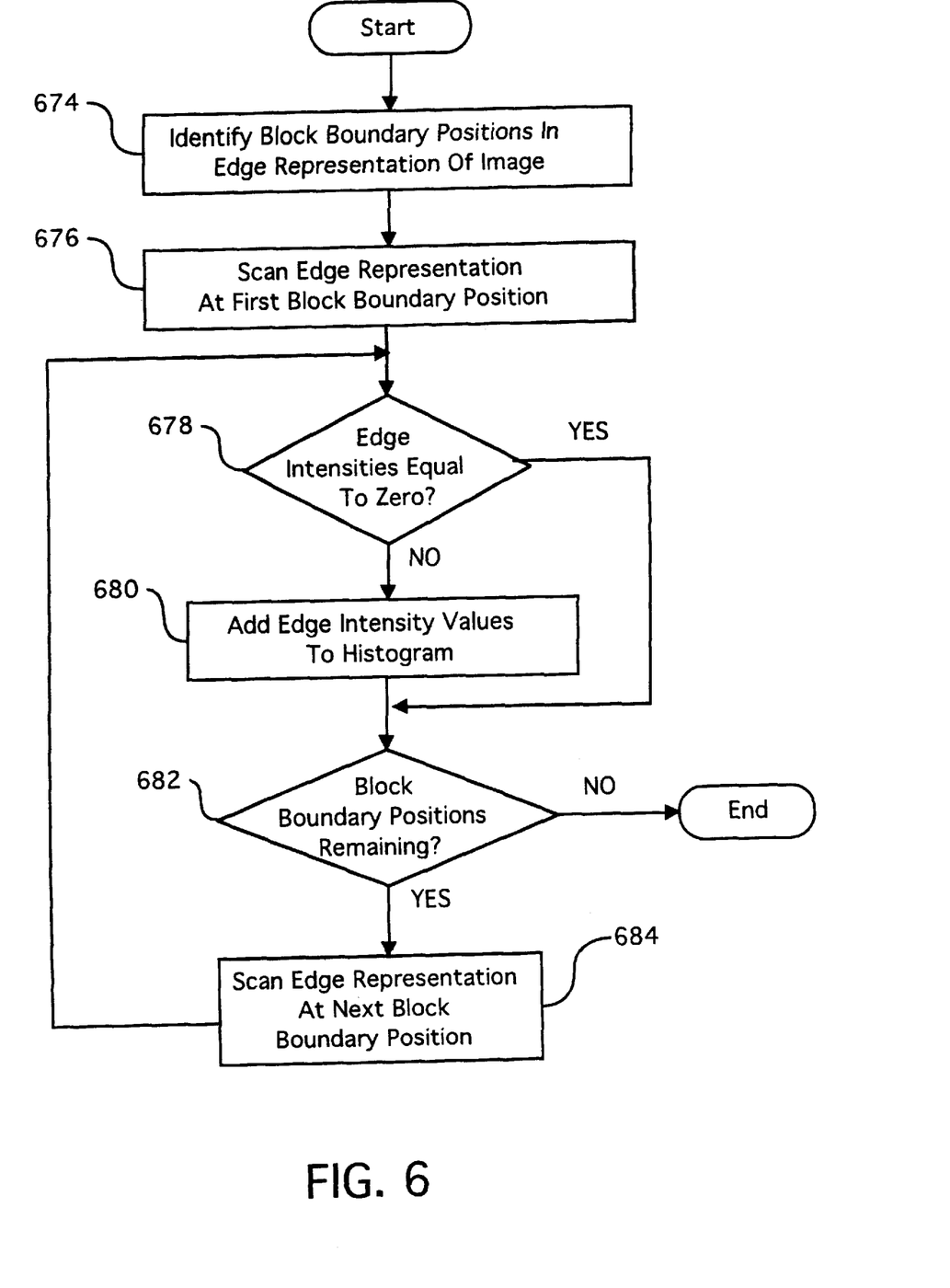
FIG. 6 is a flowchart of preferred method steps for compiling the histogram used by the present invention.
Figure 7:
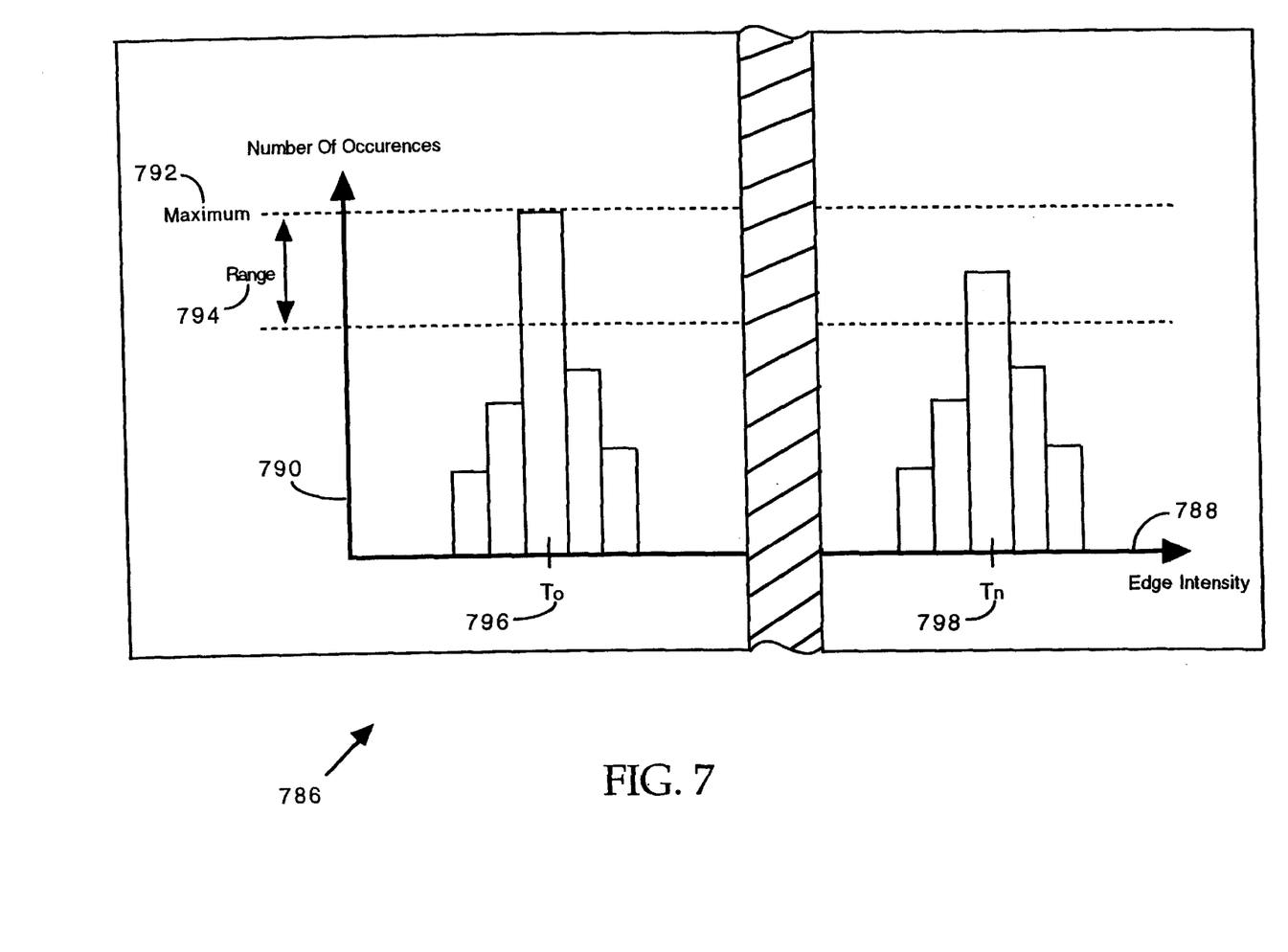
FIG. 7 is a sample histogram used by the present invention to identify reference values.

Referring now to FIG. 6, a flowchart of preferred method steps for compiling the histogram of the present invention is shown. Initially, statistics analyzer 345 identifies 674 block boundary positions in the edge representation of the image. The block boundary positions are located in specified positions which are determined when the image is initially divided into blocks for encoding. Statistics analyzer 345 then scans 676 the edge representation at the first block boundary position and determines 678 whether the scanned edge intensities are equal to zero.

If the scanned edge intensities are not equal to zero, indicating an edge exists at this location, then statistics analyzer 345 adds 680 the scanned edge intensities to the histogram of the present invention. Statistics analyzer 345 then determines 682 whether any unscanned block boundary positions remain. If no unscanned block boundary positions remain, then the FIG. 6 process ends. However, if unscanned block boundary positions remain, then statistics analyzer 345 scans 684 the edge representation at the next block boundary position. The FIG. 6 process then loops back to step 678 and repeats until all block boundary positions have been scanned and the histogram of the present invention is complete.

Referring now to FIG. 7, a sample histogram 786 used by the present invention to identify reference values is shown. Sample histogram 786 (also known as a bar chart) shows a collection of data corresponding to one possible image. However, other histograms 786 containing alternate data configurations may be compiled by statistics analyzer 345 to correspond to various other images.

Histogram 786 contains a horizontal axis 788 to display the scanned edge intensity data compiled from the edge representation. Histogram 786 also contains a vertical axis 790 to display the number of occurrences for each particular scanned edge intensity. Histogram 786 shows an occurrence maximum 792 on vertical axis 790 and an occurrence range 794 extending along vertical axis 790. Histogram 786 shows reference values $T_o$ (796) and $T_n$ (798) which are located on horizontal axis 788. The identification of reference values $T_o$(796) and $T_n$ (798) are further discussed below in conjunction with FIG. 8.

Figure 8:
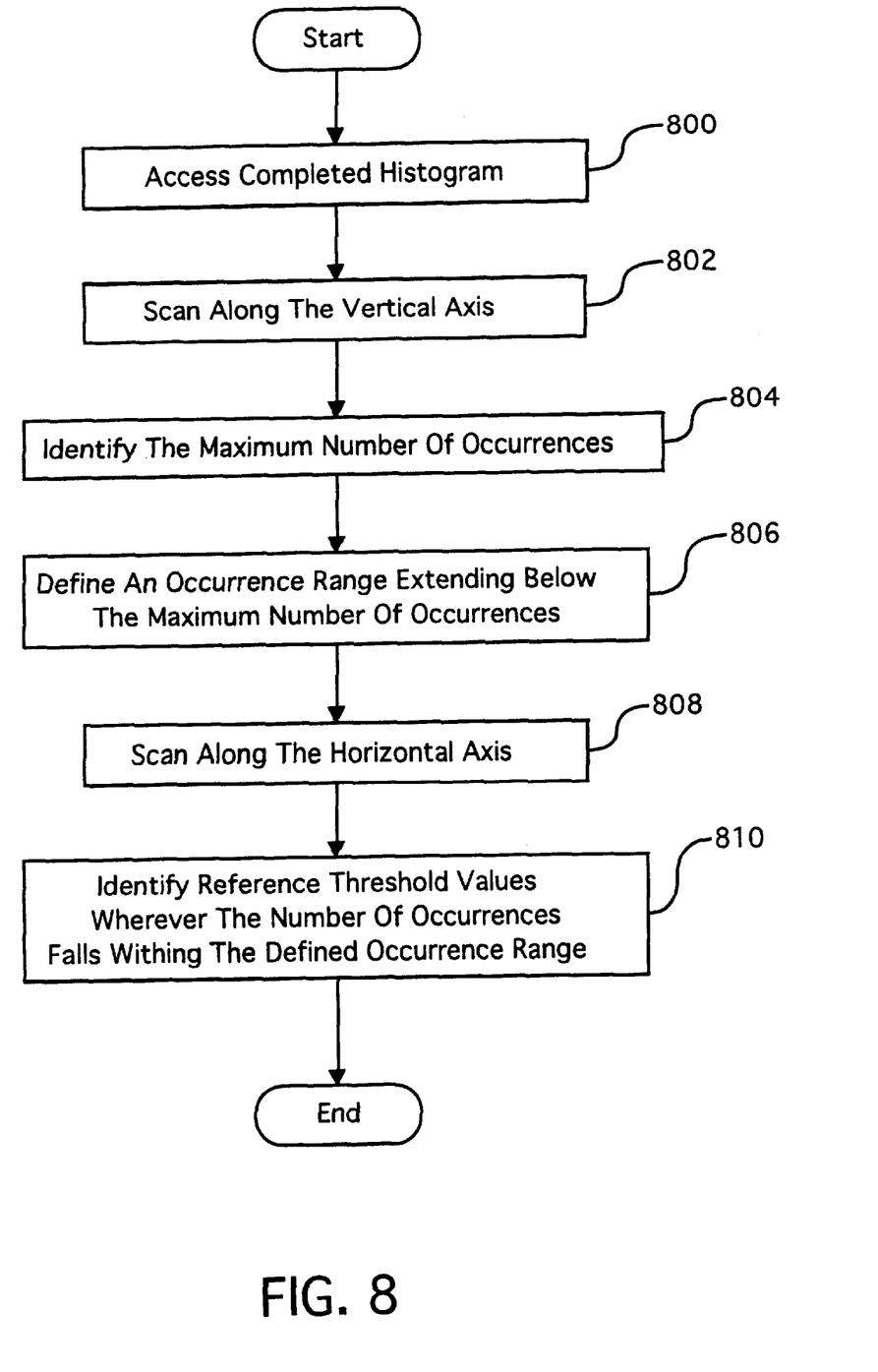
FIG. 8 is a flowchart of preferred method steps for determining reference values using the FIG. 7 histogram.

Referring now to FIG. 8, a flowchart of preferred method steps for determining reference values is shown. Initially, reference calculator 347 accesses 800 the completed histogram 786 (FIG. 7) and scans 802 along the vertical axis 790. Reference calculator 347 then identifies 804 the histogram bar having the maximum 792 number of occurrences.

Next, reference calculator 347 defines 806 an occurrence range 794 extending below maximum 792 on vertical axis 790. This range may be determined through empirical testing to achieve optimal removal of blocking artifacts according to the present invention. Reference calculator 347 then scans 808 along horizontal axis 788 and identifies 810 reference values wherever the number of occurrences falls with the defined occurrence range 794. The identified reference values are then used to identify and remove blocking artifacts as further discussed below in conjunction with FIG. 9.

Figure 9:
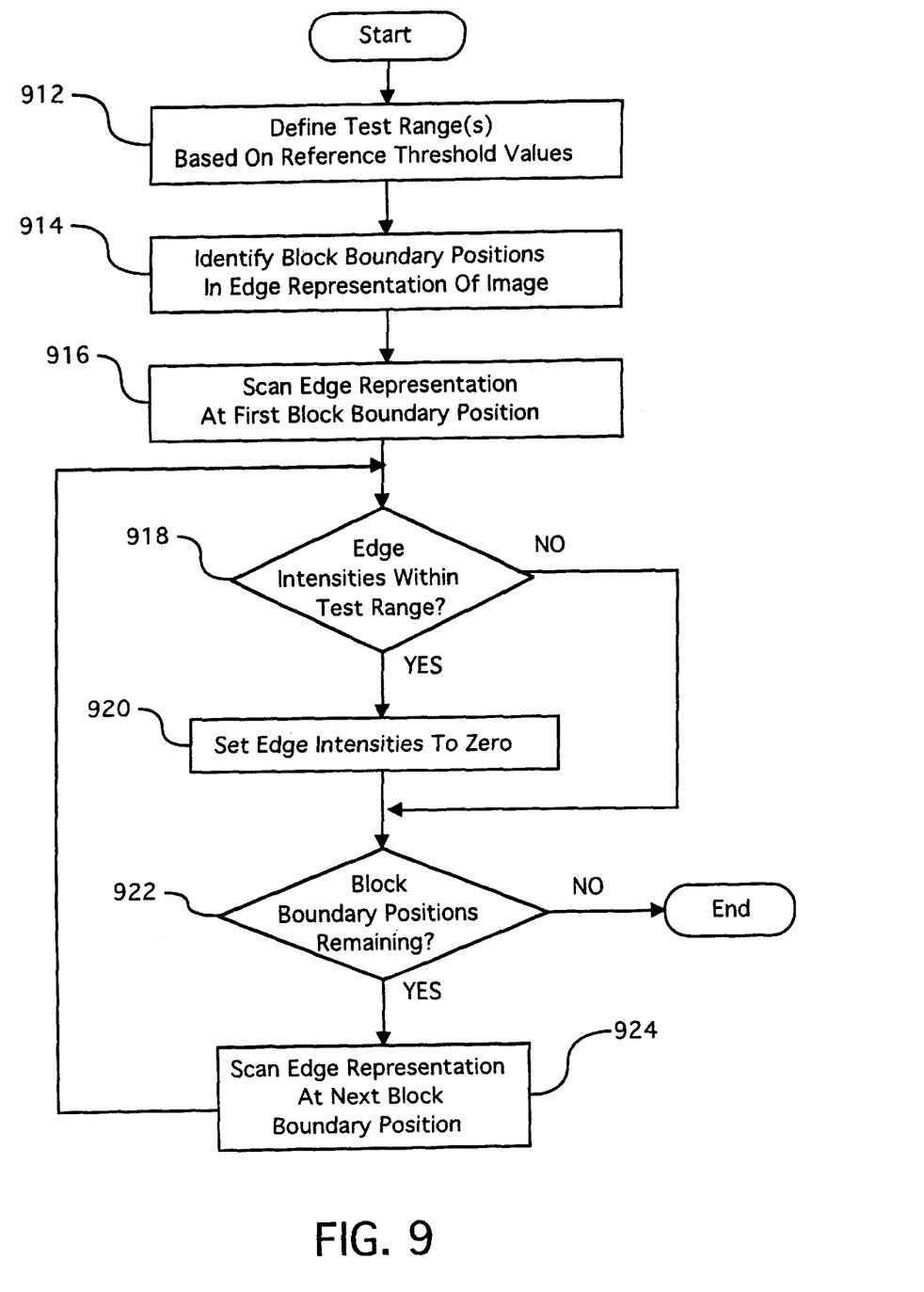
FIG. 9 is a flowchart of preferred method steps for identifying and removing blocking artifacts according to the present invention.

Referring now to FIG. 9, a flowchart of preferred method steps for identifying and removing blocking artifacts according to the present invention is shown. Initially, artifact remover 349 defines 912 a test range for each of the identified reference values. A test range typically encompasses the region on horizontal axis 788 which surrounds a given reference value. In the preferred embodiment, artifact remover 349 calculates a particular test range using the formula $$T_0-C_1<E_m<T_0+C_2$$

where $T_0$ is a given reference value, $E_m$ is the test range along horizontal axis 788, and $C_1$ and $C_2$ are constant values determined by empirical testing to produce optimal removal of blocking artifacts. In images having a single reference value, $C_1$ preferably lies between 0.5($T_0$) and 1.0($T_0$), and $C_2$ preferably lies between 1.0($T_0$) and 3.0($T_0$).

In the event that two adjacent histogram bars both lie within the occurrence range 794 on vertical axis 790, artifact remover 349 treats the adjacent bars as if they were merged into one larger bar when defining the test range. For example, if the two adjacent histogram bars have respective reference values of $T_0$ and $T_1$, then their corresponding test range on horizontal axis 788 is calculated using the following modified formula:

$$T_0-C_1<E_m<T_1+C_2.$$

After defining the test range(s), artifact remover 349 identifies 914 block boundary positions in the edge representation and scans 916 the edge representation at the first block boundary position. Next, artifact remover 349 determines 918 whether the scanned block boundary contains any edge intensities falling within the corresponding defined test range. If any edge intensities are within the corresponding test range, then artifact remover 349 sets 920 these edge intensities to a value of zero and effectively removes the corresponding block edge.

Artifact remover 349 then determines 922 whether any block boundary positions remain. If no block boundary positions remain, the FIG. 9 process ends. However, if any block boundary positions remain, then artifact remover 349 scans 924 the edge representation at the next block boundary position. The FIG. 9 process then loops back to step 918 to continue removal of the remaining block edges according to the present invention.

Once the FIG. 9 process is complete, image converter 343 then reconstructs the image (minus the blocking artifacts) from the processed edge representation as described above in conjunction with step 460 of FIG. 4. The present invention does not depend upon a particular method of reconstructing the image from the processed edge representation. Typically, a particular type of edge representation will have a number of possible corresponding reconstruction methods which differ in speed and accuracy. Reconstruction is accomplished by inverting the process used to build the original edge representation (after the block edges have been removed). In the preferred embodiment, the present invention reconstructs the original image by inverting the edge representation built using process of FIG. 5. The preferred reconstruction method is further described in *Characterization Of Signals From Multiscale Edges*, Stephane Mallat and Sifen Zhong, IEEE Transactions Of Pattern Analysis And Machine Intelligence, Vol. 14, No. 7, July 1992, which has been previously incorporated by reference.

The invention has been explained above with reference to a preferred embodiment. Other embodiments will be apparent to those skilled in the art in light of this disclosure. For example, the present invention may use various methods to build an edge representation other than that disclosed in the preferred embodiment. The present invention may also function as a discrete postprocessing device which is external to image decoder 236 and which removes blocking artifacts at some time after the decompression process has been completed. Furthermore, the present invention may be implemented to remove various other artifacts other than the block edges described in the preferred embodiment. Therefore, these and other variations upon the preferred embodiments are intended to be covered by the present invention, which is limited only by the appended claims.

What is claimed is:

1. A method for processing an image, the method comprising:
   determining artifact intensities within the image, wherein the artifact intensities indicate edge intensities within the image;
   compiling, from the artifact intensities within the image, a distribution of number of occurrences for a plurality of artifact intensity levels at a plurality of locations in the image;

identifying artifacts from the distribution and the artifact intensities within the image; and deleting the artifacts from the image.

2. A method as in claim 1, wherein the edge intensities indicate gradient magnitudes evaluated at edge locations within the image.

3. A method as in claim 1, wherein said identifying comprises:

determining one or more intensity ranges from the distribution;

determining whether or not an artifact intensity at one of the plurality of locations is in the one or more intensity ranges to identify whether or not the artifact intensity corresponds to one of the artifacts.

4. A method as in claim 3, wherein said determining the one or more intensity ranges further comprises:

determining a maximum number of occurrences in the distribution.

5. A method for processing an image, the method comprising:

determining artifact intensities within the image;

compiling, from the artifact intensities within the image, a distribution of number of occurrences for a plurality of artifact intensity levels at a plurality of locations in the image;

identifying artifacts from the distribution and the artifact intensities within the image; and deleting the artifacts from the image;

wherein the image is decompressed from a block-based image coding scheme; and the plurality of locations are along boundaries of blocks of the image coding scheme.

6. A machine readable medium containing executable computer program instructions which when executed by a data processing system cause said system to perform a method for processing an image, the method comprising:

determining artifact intensities within the image, wherein the artifact intensities indicate edge intensities within the image;

compiling, from the artifact intensities within the image, a distribution of number of occurrences for a plurality of artifact intensity levels at a plurality of locations in the image;

identifying artifacts from the distribution and the artifact intensities within the image; and deleting the artifacts from the image.

7. A medium as in claim 6, wherein the edge intensities indicate gradient magnitudes evaluated at edge locations within the image.

8. A machine readable medium containing executable computer program instructions which when executed by a data processing system cause said system to perform a method for processing an image, the method comprising:

determining artifact intensities within the image;

compiling, from the artifact intensities within the image, a distribution of number of occurrences for a plurality of artifact intensity levels at a plurality of locations in the image;

identifying artifacts from the distribution and the artifact intensities within the image; and deleting the artifacts from the image;

wherein the image is decompressed from a block-based image coding scheme; and the plurality of locations are along boundaries of blocks of the image coding scheme.

9. A machine readable medium containing executable computer program instructions which when executed by a data processing system cause said system to perform a method for processing an image, the method comprising:

determining artifact intensities within the image;

compiling, from the artifact intensities within the image, a distribution of number of occurrences for a plurality of artifact intensity levels at a plurality of locations in the image;

identifying artifacts from the distribution and the artifact intensities within the image, wherein said identifying comprises:

determining one or more intensity ranges from the distribution;

determining whether or not an artifact intensity at one of the plurality of locations is in the one or more intensity ranges to identify whether or not the artifact intensity corresponds to one of the artifacts; and deleting the artifacts from the image;

wherein said determining the one or more intensity ranges further comprises:

determining a maximum number of occurrences in the distribution.

10. A data processing system for processing an image, the data processing system comprising:

means for determining artifact intensities within the image;

means for compiling, from the artifact intensities within the image, a distribution of number of occurrences for a plurality of artifact intensity levels at a plurality of locations in the image;

means for identifying artifacts from the distribution and the artifact intensities within the image; and means for deleting the artifacts from the image, wherein the image is decompressed from a block-based image coding scheme; and the plurality of locations are along boundaries of blocks of the image coding scheme.

11. A data processing system as in claim 10, wherein the artifact intensities indicate edge intensities within the image.

12. A data processing system as in claim 11, wherein the edge intensities indicate gradient magnitudes evaluated at edge locations within the image.

13. A data processing system as in claim 10, wherein said means for identifying comprises:

means for determining one or more intensity ranges from the distribution;

means for determining whether or not an artifact intensity at one of the plurality of locations is in the one or more intensity ranges to identify whether or not the artifact intensity corresponds to one of the artifacts.

14. A data processing system as in claim 13, wherein said means for determining the one or more intensity ranges further comprises:

means for determining a maximum number of occurrences in the distribution.

15. An apparatus for processing an image, the apparatus comprising:

an image converter to determine artifact intensities within the image;

a statistics analyzer coupled to the image converter, the statistics analyzer to compile, from the artifact intensities within the image, a distribution of number of occurrences for a plurality of artifact intensity levels at a plurality of locations in the image; and an artifact remover coupled to the statistics analyzer, the artifact remover to identify artifacts from the distribution and the artifact intensities within the image and to delete the artifacts from the image;

wherein the image is decompressed from a block-based image coding scheme; and the plurality of locations are along boundaries of blocks of the image coding scheme.

16. An apparatus as in claim 15, wherein the artifact intensities indicate edge intensities within the image.

17. An apparatus as in claim 16, wherein the edge intensities indicate gradient magnitudes evaluated at edge locations within the image.

18. An apparatus for processing an image, the apparatus comprising:

an image converter to determine artifact intensities within the image;

a statistics analyzer coupled to the image converter, the statistics analyzer to compile, from the artifact intensities within the image, a distribution of number of occurrences for a plurality of artifact intensity levels at a plurality of locations in the image; and an artifact remover coupled to the statistics analyzer, the artifact remover to identify artifacts from the distribution and the artifact intensities within the image and to delete the artifacts from the image;

wherein, to identify the artifacts from the distribution, the artifact remover:

determines one or more intensity ranges from the distribution; and determines whether or not an artifact intensity at one of the plurality of locations is in the one or more intensity ranges to identify whether or not the artifact intensity corresponds to one of the artifacts;

wherein, to determine the one or more intensity ranges, the artifact remover determines a maximum number of occurrences in the distribution.

* * * * *